(12) United States Patent
Kerr et al.

(10) Patent No.: US 10,773,529 B2
(45) Date of Patent: Sep. 15, 2020

(54) ADAPTABLE SURFACE TREATMENT REPAIR SYSTEM

(71) Applicant: The Boeing Company, Chicago, IL (US)

(72) Inventors: Caitlin E. Kerr, Ladson, SC (US); Justin T. Hoehn, Mountlake, WA (US); Dhananjay B. Vasa, Columbus, OH (US); Shane E. Arthur, Kirkland, WA (US); Bennett M. Moriarty, Bothell, WA (US); Matthew H. Mellin, Charleston, SC (US); Ryan M. Trumbo, Renton, WA (US); John F. Spalding, Seattle, WA (US); Raymond C. Eng, Burien, WA (US); Kyle S. Biondich, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/279,640

(22) Filed: Feb. 19, 2019

(65) Prior Publication Data
US 2019/0176482 A1 Jun. 13, 2019

Related U.S. Application Data

(62) Division of application No. 15/251,921, filed on Aug. 30, 2016, now Pat. No. 10,226,944.

(51) Int. Cl.
*B41J 3/407* (2006.01)
*B41J 2/01* (2006.01)
(Continued)

(52) U.S. Cl.
CPC ............ *B41J 3/4073* (2013.01); *B05B 12/084* (2013.01); *B05B 13/005* (2013.01);
(Continued)

(58) Field of Classification Search
CPC ......... B41J 3/4073; B41J 2/01; B05B 12/084; B05B 13/005; B05B 13/0431;
(Continued)

(56) References Cited

U.S. PATENT DOCUMENTS

| 5,807,449 A | 9/1998 | Hooker et al. |
| 5,890,553 A | 4/1999 | Bar-Cohen et al. |

(Continued)

FOREIGN PATENT DOCUMENTS

| EP | 0369891 A2 | 5/1990 |
| EP | 2108515 A1 | 10/2009 |

(Continued)

OTHER PUBLICATIONS

Hoefener, Matthias and Thorsten Schueppstuhl. "Small industrial robots for on-aircraft repairs of composite structures." ISR/Robotik 2014; 41st International Symposium on Robotics; Proceedings of VDE, 2014, pp. 422-427.

(Continued)

*Primary Examiner* — Michael P Wieczorek
(74) *Attorney, Agent, or Firm* — Miller, Matthias & Hall LLP (57) ABSTRACT

A method of applying a surface treatment on a contoured surface includes attaching a surface treatment repair assembly to the contoured surface that includes a robotic unit and an array of applicator heads, each applicator head being configured to apply a repair treatment to the contoured surface. A location of the surface treatment relative to the surface treatment repair assembly is determined using an optical sensor configured to scan the contoured surface and generate an image data set of the contoured surface. A damaged portion of the surface treatment is identified and a target area for surface treatment repair is defined based on comparing the image data set generated by the optical sensor (Continued)

and a pristine image data set. The surface treatment repair assembly is positioned with the array of applicator heads adjacent to the surface treatment, and each applicator head is selectively operated to repair the surface treatment.

20 Claims, 6 Drawing Sheets

(51) Int. Cl.
| | | |
|---|---|---|
| *B25J 9/16* | (2006.01) | |
| *B05B 13/00* | (2006.01) | |
| *B05B 13/04* | (2006.01) | |
| *B25J 11/00* | (2006.01) | |
| *B64F 5/40* | (2017.01) | |
| *B05B 12/08* | (2006.01) | |
| *B05D 5/00* | (2006.01) | |
| *B05D 1/26* | (2006.01) | |

(52) U.S. Cl.
CPC ......... *B05B 13/0431* (2013.01); *B25J 9/1679* (2013.01); *B25J 9/1697* (2013.01); *B25J 11/0075* (2013.01); *B41J 2/01* (2013.01); *B64F 5/40* (2017.01); *B05D 1/26* (2013.01); *B05D 5/005* (2013.01)

(58) Field of Classification Search
CPC .... B25J 9/1679; B25J 9/1698; B25J 11/0075; B64F 5/40; B05C 5/027; B05C 5/0291; B05C 5/0279
See application file for complete search history.

(56) References Cited

U.S. PATENT DOCUMENTS

| | | |
|---|---|---|
| 7,076,335 B2 | 7/2006 | Seemann |
| 7,155,307 B2 | 12/2006 | Seemann |
| 7,280,890 B2 | 10/2007 | Seemann |
| 7,922,272 B2 | 4/2011 | Baird et al. |
| 7,983,790 B2 | 7/2011 | Crothers et al. |
| 8,459,384 B2 | 6/2013 | Niederberger |
| 8,545,943 B2 | 10/2013 | Frankenberger et al. |
| 9,033,464 B2 | 5/2015 | Kaiba et al. |
| 2010/0161100 A1 | 6/2010 | Crothers et al. |
| 2010/0235037 A1 | 9/2010 | Vian et al. |
| 2010/0304009 A1 | 12/2010 | Bausen et al. |
| 2012/0219699 A1 | 8/2012 | Pettersson et al. |
| 2014/0242285 A1* | 8/2014 | Pettersson ............ B05B 12/084 427/427.2 |
| 2015/0148210 A1 | 5/2015 | Sibthorpe |
| 2016/0052296 A1* | 2/2016 | Grimes .................. B41J 3/4073 347/110 |
| 2016/0075020 A1 | 3/2016 | Szarski et al. |
| 2016/0075028 A1 | 3/2016 | Bain et al. |
| 2016/0161055 A1 | 6/2016 | Bain et al. |

FOREIGN PATENT DOCUMENTS

| | | | |
|---|---|---|---|
| EP | 2204710 A1 | 7/2010 | |
| EP | 2799150 A1 | 11/2014 | |
| WO | 03101664 A1 | 12/2003 | |

OTHER PUBLICATIONS

Search Report for related European Application No. 15201161.5; report dated Jun. 2, 2016.
Search Report for related European Application No. 17188351.5; report dated Jan. 9, 2018.

* cited by examiner

ADAPTABLE SURFACE TREATMENT REPAIR SYSTEM

FIELD OF THE DISCLOSURE

The present disclosure relates generally to automated surface treatment systems and methods, and more specifically to the use of an inkjet array for automating a surface treatment repair process.

BACKGROUND OF THE DISCLOSURE

Repairing and reworking the decorative livery and protective coatings on the structural surfaces of machines, such as commercial aircraft, is a long and extensive process. Surface preparation requires technicians to perform a series of manual operations to clean and prepare the surface before the actual surface coating can begin. Furthermore, reworking the structural surfaces includes spraying or otherwise dispensing multiple layers of coatings for engineering properties, as well as to apply a decorative livery. The decorative livery is applied using a complex process which requires a series of masking operations followed by applying colored paints or coatings where they are needed. These masking and painting operations are serially repeated until the exterior surface treatment is completed. As a result, repairing the decorative livery requires a significant amount of time and resources.

SUMMARY OF THE DISCLOSURE

In accordance with one aspect of the present disclosure, a method of applying a surface treatment on a contoured surface includes attaching a surface treatment repair assembly to the contoured surface, the surface treatment repair assembly including a robotic unit and an array of applicator heads, each applicator head being configured to apply a repair treatment to the contoured surface. A location of the surface treatment relative to the surface treatment repair assembly is determined using an optical sensor configured to scan the contoured surface and generate an image data set of the contoured surface. A damaged portion of the surface treatment is identified and a target area for surface treatment repair is defined based on comparing the image data set generated by the optical sensor and a pristine image data set. The surface treatment repair assembly is positioned with the array of applicator heads adjacent to the surface treatment, and each applicator head is selectively operated to repair the surface treatment.

In accordance with another aspect of the present disclosure, a method of applying a surface treatment on a contoured surface includes attaching a surface treatment repair assembly to the contoured surface, the surface treatment repair assembly including a robotic unit, having an articulated support arm, and an array of applicator heads mounted on the articulated support arm of the robotic unit, wherein each applicator head of the array of applicator heads is configured to apply a repair treatment to the contoured surface. A location of the surface treatment relative to the surface treatment repair assembly is determined using an optical sensor configured to scan the contoured surface and generate an image data set of the contoured surface. A damaged portion of the surface treatment is identified and a target area for surface treatment repair is defined based on comparing the image data set generated by the optical sensor and a pristine image data set. The robotic unit is moved to position the array of applicator heads adjacent to the target area, each applicator head of the array of applicator heads is selectively operated to repair the damaged portion of the surface treatment on the contoured surface.

In accordance with yet another aspect of the present disclosure, a method of applying a surface treatment on a contoured surface of an airplane includes attaching a surface treatment repair assembly to the contoured surface, the surface treatment repair assembly including a robotic unit, having an articulated support arm, and an array of applicator heads mounted on the articulated support arm of the robotic unit, wherein each applicator head of the array of applicator heads is configured to apply a repair treatment to the contoured surface. A location of the surface treatment relative to the surface treatment repair assembly is determined using an optical sensor, configured to scan the contoured surface and generate an image data set of the contoured surface, and an orientation sensor, configured to determine an orientation of each applicator head and generate an orientation data set. A damaged portion of the surface treatment is identified and a target area for surface treatment repair is defined based on comparing the image data set generated by the optical sensor and a pristine image data set. The robotic unit is moved to position the array of applicator heads adjacent to the target area, each applicator head of the array of applicator heads is positioned based on the orientation data set, and each applicator head of the array of applicator heads is selectively operated to repair the damaged portion of the surface treatment on the contoured surface.

The features, functions, and advantages disclosed herein can be achieved independently in various embodiments or may be combined in yet other embodiments, the details of which may be better appreciated with reference to the following description and drawings.

It should be understood that the drawings are not necessarily to scale, and that the disclosed embodiments are illustrated diagrammatically, schematically, and in some cases in partial views. In certain instances, details which are not necessary for an understanding of the disclosed methods and apparatuses or which render other details difficult to perceive may have been omitted. It should be further understood that the following detailed description is merely exemplary and not intended to be limiting in its application or uses. As such, although the present disclosure is for purposes of explanatory convenience only depicted and described in illustrative embodiments, the disclosure may be implemented in numerous other embodiments, and within various systems and environments not shown or described herein.

DETAILED DESCRIPTION

The following detailed description is intended to provide both methods and devices for carrying out the disclosure. Actual scope of the disclosure is as defined by the appended claims.

Figure 1:
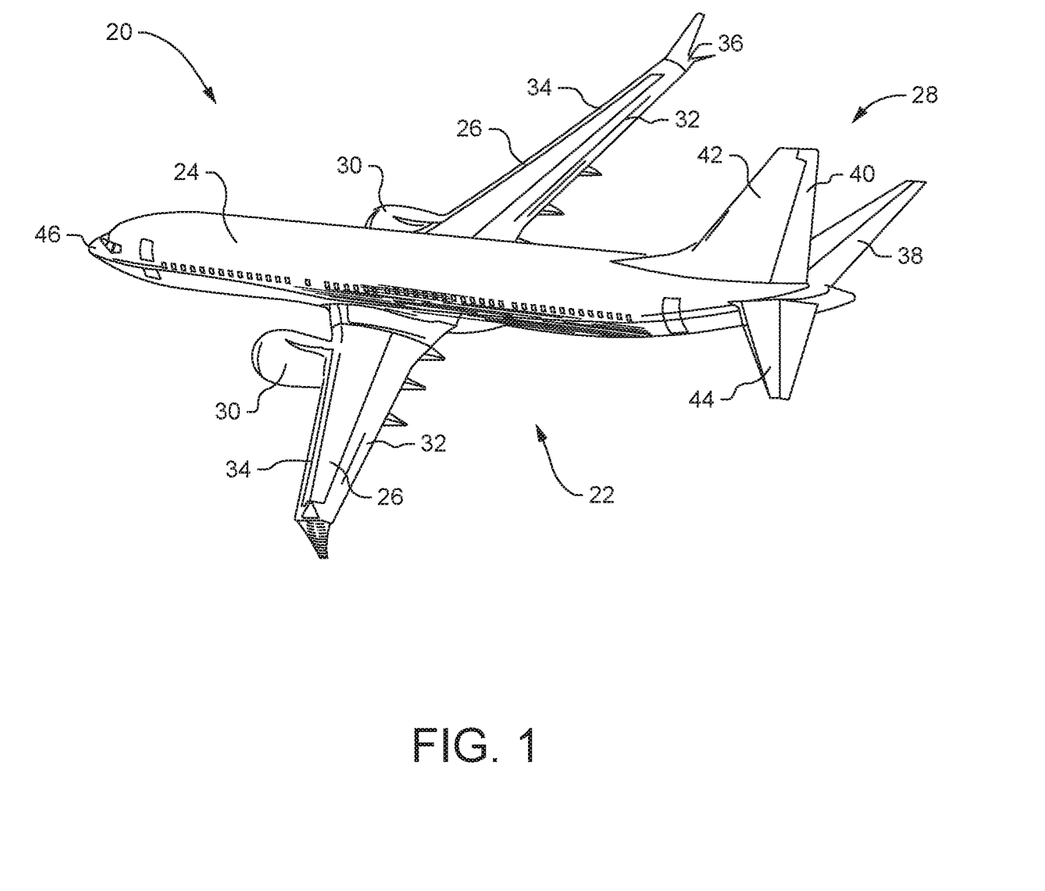
FIG. 1 is a perspective view of an exemplary vehicle constructed in accordance with the present disclosure.

In FIG. 1, a vehicle 20 is illustrated. One non-limiting example of the vehicle 20 is that of an aircraft, however the present disclosure applies to other types of vehicles and machines as well. As illustrated, the vehicle 20 is configured with an airframe 22 which includes a fuselage 24, wings 26, and a tail section 28. In some embodiments, one or more propulsion units 30 are coupled to each wing 26 in order to propel the vehicle 20 in a direction of travel. Furthermore, the wings 26 are fixedly attached to the fuselage 24 and the propulsion units 30 are attached to an underside surface of the wing 26, however other attachment locations of the propulsion units 30 are possible. In some embodiments, the wings 26 are positioned at a substantially centered position along the fuselage 24, and the wings 26 are configured to include a plurality of flaps 32, leading edge devices 34, and peripheral edge devices 36. Moreover, during operation of the vehicle 20, the flaps 32, leading edge devices 34 and peripheral edge devices 36 are capable of being adjusted in a plurality of ways in order to control and stabilize the vehicle 20. For example, the flaps 32 and leading edge devices 34 are adjustable to produce the desired lift characteristics of the wings 26. Furthermore, in some embodiments, the tail section 28 of the airframe 22 is comprised of components such as, an elevator 38 a rudder 40 a vertical stabilizer fin 42 and a horizontal stabilizer 44 which provide additional stability and maneuverability functions of the vehicle 20. A nose portion 46 of the fuselage 24 is located at an opposite end of the fuselage 24 from the tail section 28. In some embodiments, the nose portion 46 is designated as the front of the fuselage 24 and the tail section 28 is designated as the rear of the fuselage 24.

Figure 2:
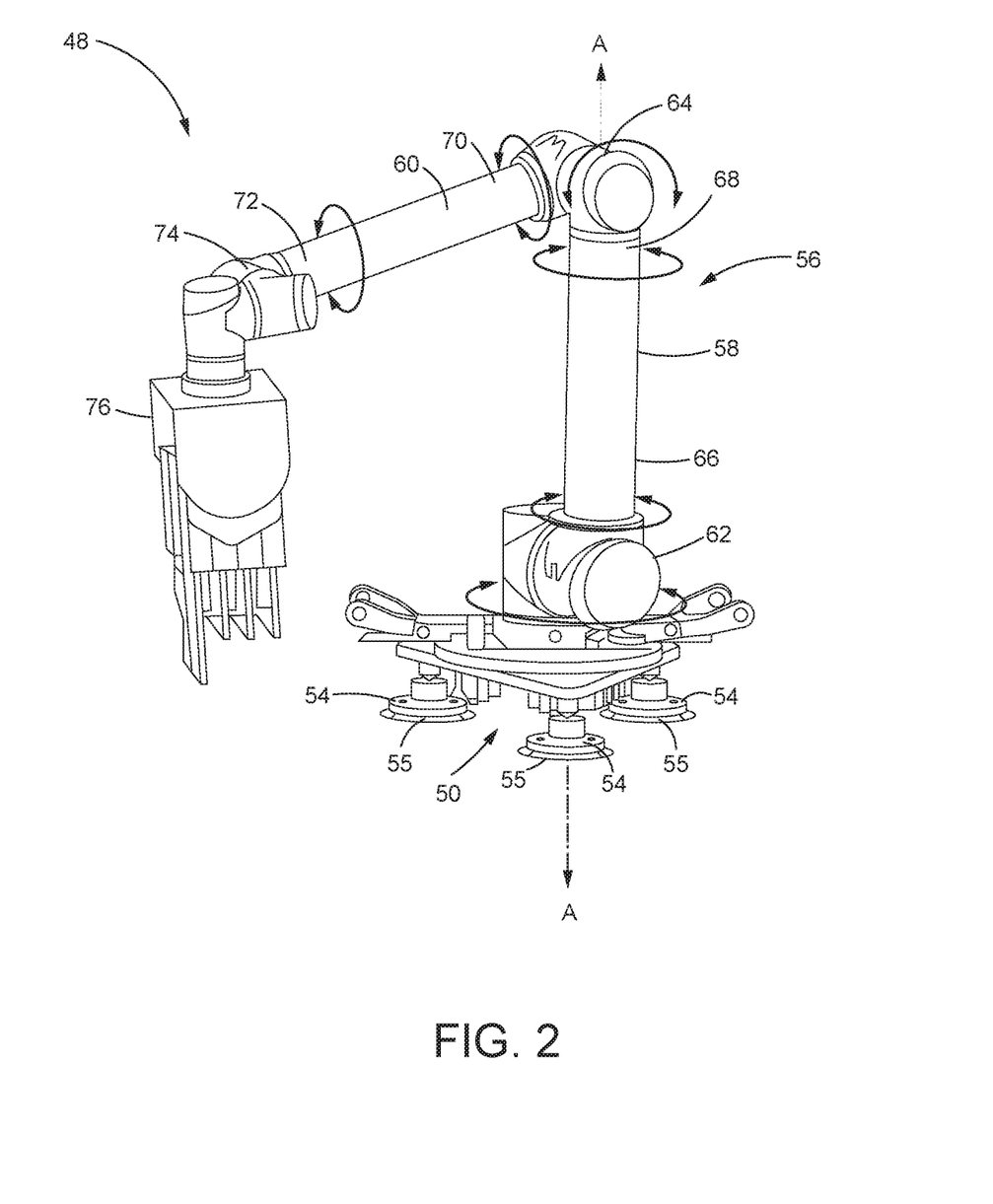
FIG. 2 is a perspective view of an exemplary robotic unit, in accordance with the present disclosure.
Figure 3:
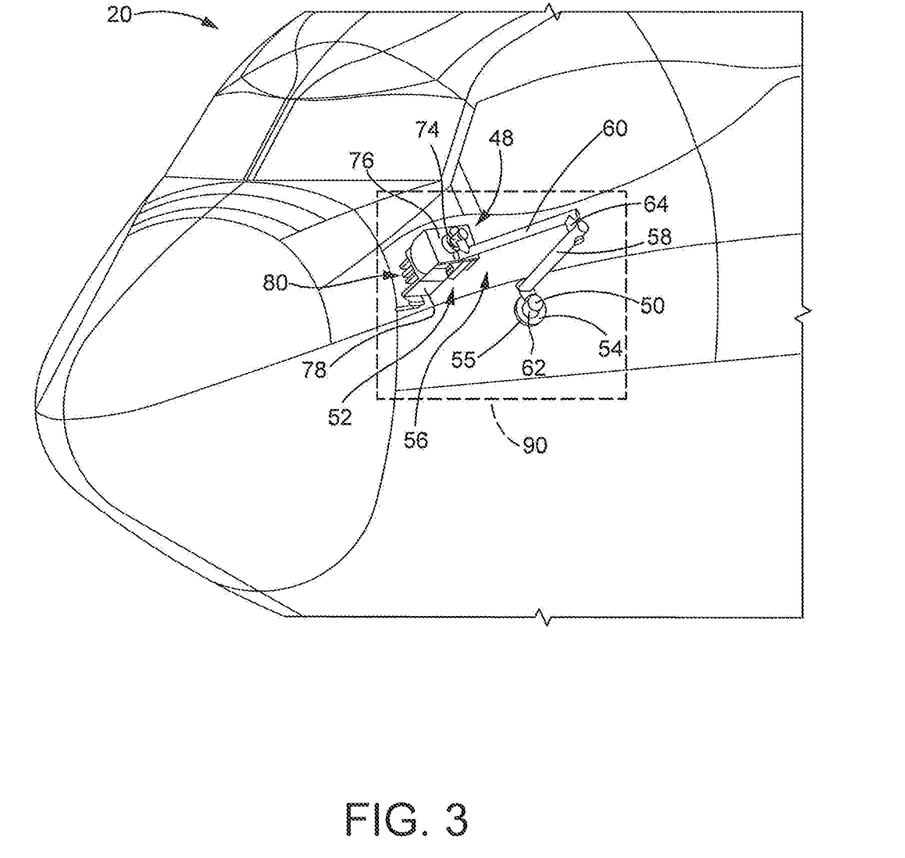
FIG. 3 is a perspective view of the exemplary vehicle of FIG. 1, being treated by an exemplary robotic unit, in accordance with the present disclosure.
Figure 4:
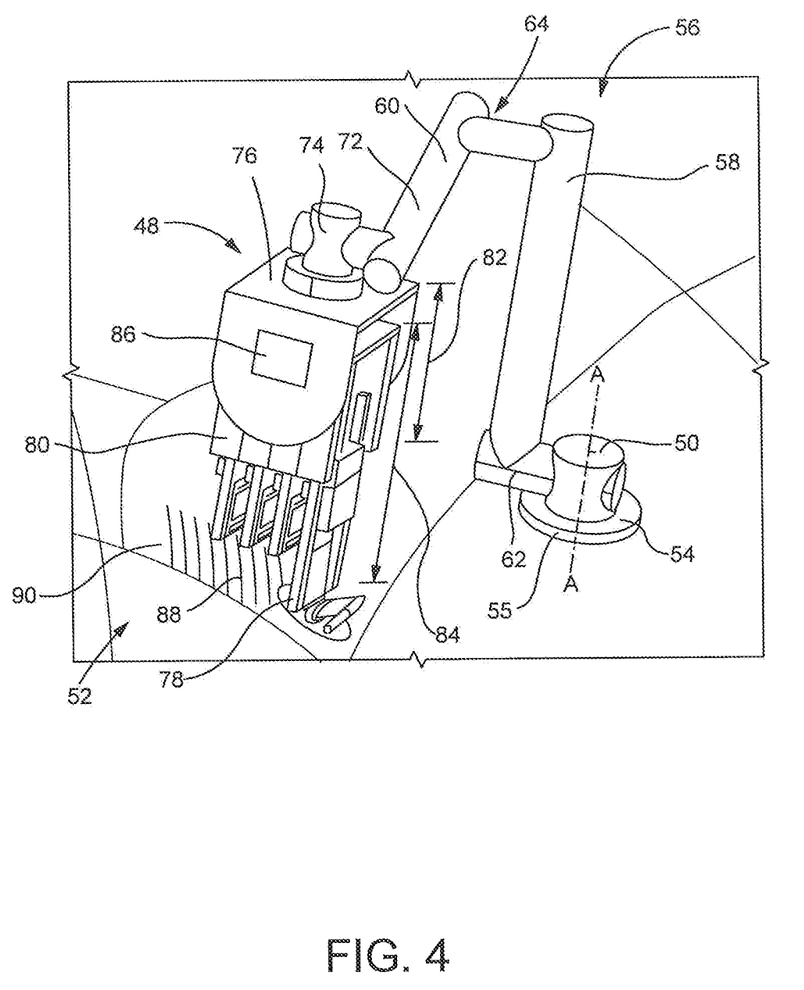
FIG. 4 is a perspective view of an exemplary contoured surface being treated by the robotic unit of FIG. 3, in accordance with the present disclosure.

Moving on to FIGS. 2-4 and with continued reference to FIG. 1, one non-limiting example of a robotic unit 48 is illustrated. In one exemplary embodiment, the robotic unit 48 is configured to include an attachment device 50 for removably attaching the robotic unit 48 to a surface of the vehicle 20. In some embodiments, portions of the fuselage 24 wings 26, tail section 28, nose portion 46, or other portion of the vehicle 20, define a contoured surface 52, or other such surface of the vehicle 20. As a result of at least some portions of the vehicle 20 having a contoured surface 52 in some embodiments, the attachment device 50 of the robotic unit 48 includes one or more attachment heads 54, which are capable of attaching the robotic unit 48 to the contoured surface 52 of the vehicle 20. Moreover, in one non-limiting example, the attachment heads 54 are configured with one or more sealing elements 55, such as but not limited to a suction cup, an o-ring, a gasket, or other such sealing element, which are capable of creating a negative pressure or a partial vacuum between the contoured surface 52 and the attachment device 50. The negative pressure or partial vacuum created by the one or more attachment heads 54 and the sealing elements 55 is used for removably attaching the robotic unit 48 to the vehicle 20. In some embodiments, the one or more attachment heads 54 are pressed into place such that the sealing elements 55 create and maintain a substantially airtight seal with the contoured surface 52. Furthermore, the one or more attachment heads 54 and the sealing elements 55 produce the necessary negative pressure to securely hold the robotic unit 48 in place. Additionally, or alternatively, the attachment device 50 is coupled to an external vacuum source which assists the one or more attachment heads 54 and the sealing elements 55 in creating and maintaining the necessary negative pressure or vacuum for attaching the robotic unit 48 to the contoured surface 52 of the vehicle 20. Furthermore, the attachment device 50 and the one or more attachment heads 54 are configured such that the attachment force holding the robotic unit 48 onto the contoured surface 52 is capable of being activated and/or deactivated in order to attach and/or detach the robotic unit 48 from the contoured surface 52 of the vehicle 20. Suction cups, o-rings, gaskets, and other such sealing elements are non-limiting examples provided of the sealing elements 55 incorporated with the attachment heads 54. However, it will be appreciated that other attachment mechanisms, such as but not limited to, magnets, adhesives, and mechanical fastening devices, are available to be used by the attachment device 50 to removably attach the robotic unit 48 to the contoured surface 52 of the vehicle 20. Alternatively, in some embodiments, the robotic unit 48 is mounted on an automated ground vehicle (AGV) which is positioned adjacent to the vehicle 20. Moreover, instead of attaching the robotic unit 48 to the contoured surface 52, the AGV is configured to transport the robotic unit 48 to the portion of the vehicle 20 and position the robotic unit 48 along the contoured surface 52.

Referring to FIG. 3 with continued reference to FIGS. 1-2, one non-limiting example of the robotic unit 48 being attached to the contoured surface 52 of the vehicle 20 is illustrated. As shown, the robotic unit 48 is located on the nose portion 46 of the vehicle 20 and positioned to treat the contoured surface 52 of the vehicle 20. In some embodiments, the treatment of the nose portion 46 or other such portion of the vehicle 20, by the robotic unit 48 includes performing a surface treatment to repair or otherwise treat the contoured surface 52 of the vehicle 20. In some embodiments, the surface treatment provided by the robotic unit 48 includes treatments such as but not limited to, cleaning, abrading, priming, painting, protecting and/or any other known surface treatment. Furthermore, while the robotic unit 48 is shown in FIG. 3 as being attached to and treating the nose portion 46, attachment to another area of the vehicle 20, such as the fuselage 24, the wing 26, the propulsion unit 30, the tail section 28, or other such area of the vehicle 20 is possible.

As further illustrated in FIG. 2, the robotic unit 48 is portable such that it is easily transported to and positioned at the desired location of the vehicle 20, and the robotic unit 48 is configured to move or articulate around an area of the contoured surface 52 of the vehicle 20. In one non-limiting example, the robotic unit 48 is equipped with an articulated support arm 56 that facilitates linear and angular movement, and other adjustment capability of the robotic unit 48. In some embodiments, the articulated support arm 56 includes a first arm portion 58, a second arm portion 60, a first joint 62 and a second joint 64. Moreover, the first joint 62 and the second joint 64 are configured to allow rotation, revolution, and other such movements of the robotic unit 48. For example, in one non-limiting example, the first joint 62 and the second joint 64 are capable of providing a rotation and revolution of the articulated support arm 56, represented by the rotational arrows shown in FIG. 2. As a result of the movement capabilities provided by the first and second joints 62, 64, the articulated support arm 56 is able to extend, contract and rotate about an axis A-A of the robotic unit 48.

Moreover, in some embodiments, a first end 66 of the first arm portion 58 is attached to the first joint 62 and a second end 68 of the first arm portion 58 is attached to the second joint 64. Additionally, the first joint 62 is rotatably coupled to the attachment device 50. Furthermore, a first end 70 of the second arm portion 60 is attached to the second joint 64 and a second end 72 of the second arm portion 60 is attached to a third joint 74. In one non-limiting example, a treating unit 76, such as but not limited to an inkjet printing device, is attached to the third joint 74 of the robotic unit 48 and configured to treat the contoured surface 52 of the vehicle 20.

Referring to FIG. 4, with continued reference to FIGS. 2-3, one example of the treating unit 76 is illustrated. In some embodiments, the treating unit 76 is attached to the second end 72 of the second arm portion 60 and the third joint 74 of the robotic unit 48. Furthermore, the treating unit 76, as shown in FIG. 4, is that of an inkjet print head, which in one non-limiting example, is used for treating and repairing the paint or other decorative and protective coating on the contoured surface 52. In some embodiments, the treating unit 76 is configured to have one or more applicator heads 78 arranged to form a treatment array 80. Moreover, the treating unit 76 is configured to allow linear adjustment of the treatment array 80, as well as linear adjustment of the one or more applicator heads 78. For example, the linear adjustment of the treatment array 80 and the one or more applicator heads 78 is used to adjust the treating unit 76 according to a contour of the contoured surface 52. As such, in some embodiments, the treatment array 80 is configured to include a first stage linear actuator 82 (shown in FIG. 5) that moves the treatment array 80 up, down, left and right, with respect to the contoured surface 52. Additionally, the one or more applicator heads 78 are configured to include a second stage linear actuator 84 (shown in FIG. 5) which is capable of moving the one or more applicator heads 78, either independently or in unison, up, down, left and right, with respect to the contoured surface 52. In some embodiments, the first stage linear actuator 82 (FIG. 5) is configured to provide a coarse adjustment for the treatment array 80 and the second stage linear actuator 84 (FIG. 5) is configured to provide a fine adjustment for the one or more applicator heads 78, however other configurations are possible. The inkjet array described above is one exemplary application of the treating unit 76. Alternatively or additionally, the treating unit 76 is an alternate applicator head configured for applying additional coatings, such as but not limited to, an adhesion promoter, a primer, a clear coat, or other such coatings. Furthermore, the treating unit 76 can be configured with other attachments, such as but not limited to, a composite material repair tool, a surface scanning device, or other such attachments that can be attached to the robotic unit 48 and used to repair the contoured surface 52 of the vehicle 20.

Figure 5:
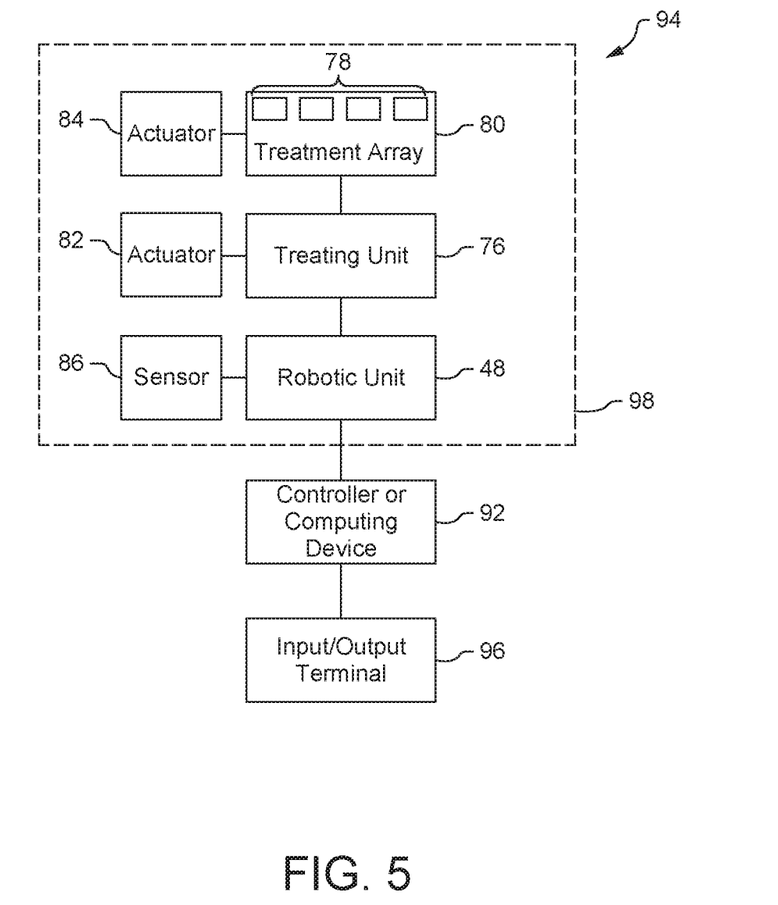
FIG. 5 is a schematic view of an exemplary control and communication system in accordance with the present disclosure.

Referring to FIGS. 4-5 and with continued reference to FIGS. 2-3, in some embodiments, the first stage linear actuator 82 of the treatment array 80 and second stage linear actuator 84 of the one or more applicator heads 78 are independently controllable and adjustable in order to maintain a specified gap between the one or more applicator heads 78 and the contoured surface 52. For example, in some embodiments, the one or more applicator heads 78 are adjusted to maintain a 4 millimeter gap between the one or more applicator heads 78 and the contoured surface 52, however other gaps are possible. Furthermore, during operation of the treating unit 76, first stage linear actuator 82 of the treatment array 80 and the second stage linear actuator 84 of the one or more applicator heads 78 are continuously adjusted along with the articulated support arm 56 to maintain a normal or orthogonal relationship between treating unit 76 and the contoured surface 52. In one non-limiting example, the treating unit 76 is equipped with one or more sensors 86 which are attached to and arranged around the treating unit 76, and the one or more sensors 86 are configured to scan the contoured surface 52 of the vehicle 20 in order to collect imaging data, optical data, height sense, and other surface metrology data. Furthermore, in some embodiments, the one or more sensors 86 are also used to track the location of the treating unit 76, and to determine the orientation of the treating unit 76, the treatment array 80, the one or more applicator heads 78, or any other such functions.

As further illustrated in FIG. 4, a repair treatment layer 88 is applied to the contoured surface 52. In some embodiments, the one or more applicator heads 78 of the treatment array 80 are independently controlled to selectively apply the repair treatment layer 88 where it is needed on the contoured surface 52. Furthermore, in some embodiments, the repair treatment layer 88 comprises one or more coatings, such as but not limited to, a surface protective layer, an adhesion promoting layer, a primer layer, a basecoat layer, a top coat layer, a clear coat layer, or other known coatings. Furthermore, in some embodiments, the repair treatment layer 88 is applied onto a target area 90 of the contoured surface 52. In one non-limiting example, the one or more sensors 86 are utilized to determine the target area 90 of the contoured surface 52 which has experienced damage or other such condition to the surface of the contoured surface 52 and is in need of repair. For example, in one non-limiting example, the one or more sensors 86 includes an optical sensor configured to scan and collect surface image data such that the optical sensor produces an image data set of the decorative livery layer or other such coating present on the contoured surface 52 of the vehicle 20. Moreover, in some embodiments, the one or more sensors 86 are communicably coupled to a controller or computing device 92 (shown in FIG. 5) and the image data set is transmitted from the one or more sensors 86 on the treating unit 76 to the controller or computing device 92 for analysis.

In one non-limiting example, the controller or computing device 92 (shown in FIG. 5) compares the image data set that is collected and produced by the one or more sensors 86, with a pristine image data set of the vehicle 20. As a result, the controller or computing device 92 can detect damage or other conditions of the paint or decorative layer present on the contoured surface 52 of the vehicle 20. Furthermore, the controller or computing device 92 can use the image data set collected by the one or more sensors 86 and the pristine image data set to determine the specific location of where the robotic unit 48 was located when the one or more sensors 86 collected the image data set. As a result, in some embodiments, the one or more sensors 86 and the controller or computing device 92 work together to locate and determine the target area 90 on the contoured surface 52 that is in need of repair, as well as determine the exact contoured surface 52 location of the robotic unit 48.

In some embodiments, the robotic unit 48 is configured to be portable and removably attached to the contoured surface 52 of the vehicle 20. As described above, some embodiments of the robotic unit 48 include the attachment device 50, and one or more attachment heads 54 and sealing elements 55 for attaching the robotic unit 48 to the contoured surface 52. In an exemplary embodiment illustrated in FIG.

4, the attachment device 50 uses one attachment head 54 and sealing element 55 to secure the robotic unit 48 to the contoured surface 52. Alternatively, as shown in FIG. 2, the attachment device 50 uses more than one attachment head 54 and sealing element 55, to secure the robotic unit 48 to the contoured surface 52. As such, the attachment device 50, the one or more attachment heads 54 and sealing elements 55 allow for quick attachment and detachment from the contoured surface 52.

Furthermore, the portability and attachment capabilities allow the robotic unit 48 to be moved around the vehicle 20 in order to gain access to otherwise difficult areas to reach. Furthermore, some embodiments of the robotic unit 48 is configured to treat and repair specified areas on the contoured surface 52 without the need for large pieces of supporting equipment, such as a gantry crane, a ground vehicle, or other such piece of equipment, to move and position the treating unit 76 into place. Referring back to FIG. 2, with continued reference to FIGS. 3-4, the robotic unit 48 incorporates an articulated support arm 56 which includes components, such as but not limited to, the first arm portion 58, the second arm portion 60, the first joint 62, the second joint 64 and the third joint 74. In one non-limiting example, the articulated support arm 56 provides a range of movement that defines a capable coverage area which allows the robotic unit 48 to scan and repair the target area 90 on the contoured surface 52 having a certain surface area without the need to attach, detach, and reattach the robotic unit 48 from the contoured surface 52. For example, in some embodiments, the target area 90 may be configured as a square, rectangle, circle, arc, or other such shape, and the robotic unit 48 is configured to treat the target area 90 having dimensions, such as a length, width, radius, or other such dimension, between 1-10 feet, however other dimensions are possible.

Referring to FIG. 4, with continued reference to FIGS. 1-3, the contoured surface 52 of the fuselage 24, wings 26, tail section 28, nose portion 46, or other portions of the vehicle 20, is typically constructed from a material such as aluminum, aluminum alloy, titanium, carbon composite, or other known material. Furthermore, during the repair treatment of the contoured surface 52 the treating unit 76, including the treatment array 80 and the one or more applicator heads 78, applies one or more coatings of the repair treatment layer 88 on the contoured surface 52. In some embodiments, the treatment array 80 and each of the one or more applicator heads 78 are configured as an inkjet printing array which is configured to jet or otherwise apply a specified coating, such as but not limited to, a decorative livery coating, onto the contoured surface 52. Furthermore, the inkjet printing array is capable of supplying a full range of colored coatings using colors, such as but not limited to, cyan, magenta, yellow and black. Moreover, in some embodiments, the treating unit 76, the treatment array 80 and the one or more applicator heads 78 are controlled to jet or otherwise apply the repair treatment layer 88 onto the target area 90 of the contoured surface 52 in a single pass. However, as discussed above, in some embodiments, a plurality of different coatings comprise the repair treatment layer 88, such as a surface protective layer, an adhesion promoter, a primer layer, a basecoat layer, a top coat layer, a clear coat layer, or other known coatings. As a result, in one non-limiting example, the treating unit 76 is configured to apply the plurality of coatings which comprise repair treatment layer 88, one coating at a time in a single pass along the target area 90 of the contoured surface 52, however other coating patterns and configurations are possible.

FIG. 5 illustrates a schematic of a control and communication system 94 that is configured to operate and monitor the robotic unit 48. In some embodiments, the control and communication system 94 includes the controller or computing device 92 and an input/output terminal 96, which is communicably coupled to the controller or computing device 92. Furthermore, the input/output terminal 96 is configured for a user to input commands or instructions to the controller or computing device 92, as well as, to view data and other information which is output by the controller or computing device 92. Moreover, the controller or computing device 92 is communicably coupled to the robotic unit 48 such that the controller or computing device 92 is able to send operational commands and other such instructions to the robotic unit 48, as well as, receive data and other output from the robotic unit 48.

As discussed above, one non-limiting example of the robotic unit 48 includes a treating unit 76 and a treatment array 80 formed from one or more applicator heads 78. Furthermore, in some embodiments, the treating unit 76 is adjustably coupled to the first stage linear actuator 82 and the one or more applicator heads 78 is adjustably coupled to the second stage linear actuator 84. As a result, the operational commands and other instructions received from the controller or computing device 92 are used by the first stage linear actuator 82 and the second stage linear actuator 84 to adjust and manipulate the treating unit 76, the treatment array 80, and the one or more applicator heads 78 of the robotic unit 48.

In some embodiments, the controller or computing device 92 and the input/output terminal 96 are located remotely from a work area 98, where the robotic unit 48 and vehicle 20 are located. As a result, communication between the controller or computing device 92 and the robotic unit 48 is established using Bluetooth communication, a radio frequency network, a computer data network, a Wi-Fi data network, a cellular data network, a satellite data network, or any other known communication network. Alternatively, the controller or computing device 92 and the input/output terminal 96 are located within the work area 98 and set up in a position adjacent to the robotic unit 48. In one non-limiting example of the adjacent location configuration, the controller or computing device 92 and the robotic unit 48 are directly connected and communicate through a wired connection. However, in other embodiments of the adjacent location configuration, the controller or computing device 92 are configured to communicate using Bluetooth communication, a radio frequency network, a computer data network, a Wi-Fi data network, a cellular data network, a satellite data network or any other known communication network.

A user of the control and communication system 94, such as an operator, a supervisor, or other interested personnel, can access the controller or computing device 92 using the input/output terminal 96. In some embodiments, the input/output terminal 96 allows for commands and other instructions to be input through a keyboard, mouse, dial, button, touch screen, microphone or other known input devices. Furthermore, data and other information from the controller and computing device 92 will be output to a monitor, speaker, printer, or other known output device for the user. In some embodiments, the input/output terminal 96 is coupled to the controller or computing device 92 through a wired connection. Alternatively, the input/output terminal 96 is coupled to the controller or computing device 92 through a wireless communication network such as Bluetooth, near-field communication, a radio frequency network, a computer data network, a Wi-Fi data network, a cellular data network, a satellite data network or any other known communication network. In some embodiments, the input/output terminal 96 is a handheld mobile device, such as a tablet computer, a smart phone device, or other such mobile device, and the handheld mobile device is wirelessly coupled to the controller or computing device 92. As a result, a user and the handheld input/output terminal 96 may be remotely located from the controller or computing device 92 and/or the robotic unit 48. Such a configuration will allow for flexibility of monitoring and operating the control and communication system 94 during the repair treatment of the contoured surface 52.

In some embodiments, the controller or computing device 92 is composed of a computing device capable of executing a series of control commands and/or software which allows the user to direct and control the robotic unit 48. Furthermore, the controller or computing device 92 includes a processing device and memory storage device which allows the controller or computing device 92 to receive, store, analyze, and perform other such control and computing functions. In one non-limiting example, the user is able to use the controller or computing device 92 to program or control a repair pattern or process for the robotic unit 48 to follow while applying the repair treatment layer 88 on the target area 90 of the contoured surface 52. Furthermore, the communication network established between the controller or computing device 92 and the robotic unit 48 allows for two-way communication such that commands and instructions sent by the controller or computing device 92 are received by the robotic unit 48, and data which is collected by the robotic unit 48 is sent to and received by the controller or computing device 92.

In one non-limiting example, the one or more sensors 86 mounted on the treating unit 76, or other location of the robotic unit 48, are coupled to the controller or computing device 92. Therefore, the data collected by the plurality of sensors 86 is capable of being transmitted to the controller or computing device 92. As a result, the controller or computing device 92 uses the collected data from the plurality of sensors 86 to control and adjust the robotic unit 48. For example, in one exemplary embodiment, the one or more sensors 86 include an image sensor which is configured to scan the contoured surface 52 and produce an image data file. In some embodiments, the image data file is sent to the controller or computing device 92 and compared with a pristine image data file of the contoured surface 52. The comparison or other analysis between the collected image data file with the pristine image data file by the controller and computing device 92 detects a defect, damage or other repairable condition on the contoured surface 52. The collected data is then transmitted or otherwise communicated to the controller or computing device 92 such that the control mechanism and/or software of the controller or computing device 92 is able to make the necessary adjustments to the robotic unit 48. Additionally, in some embodiments, the user is able to view the real-time actions of the robotic unit 48 on the input/output terminal 96, and if necessary make necessary adjustments or control commands to the robotic unit 48 using the input/output terminal 96.

Figure 6:
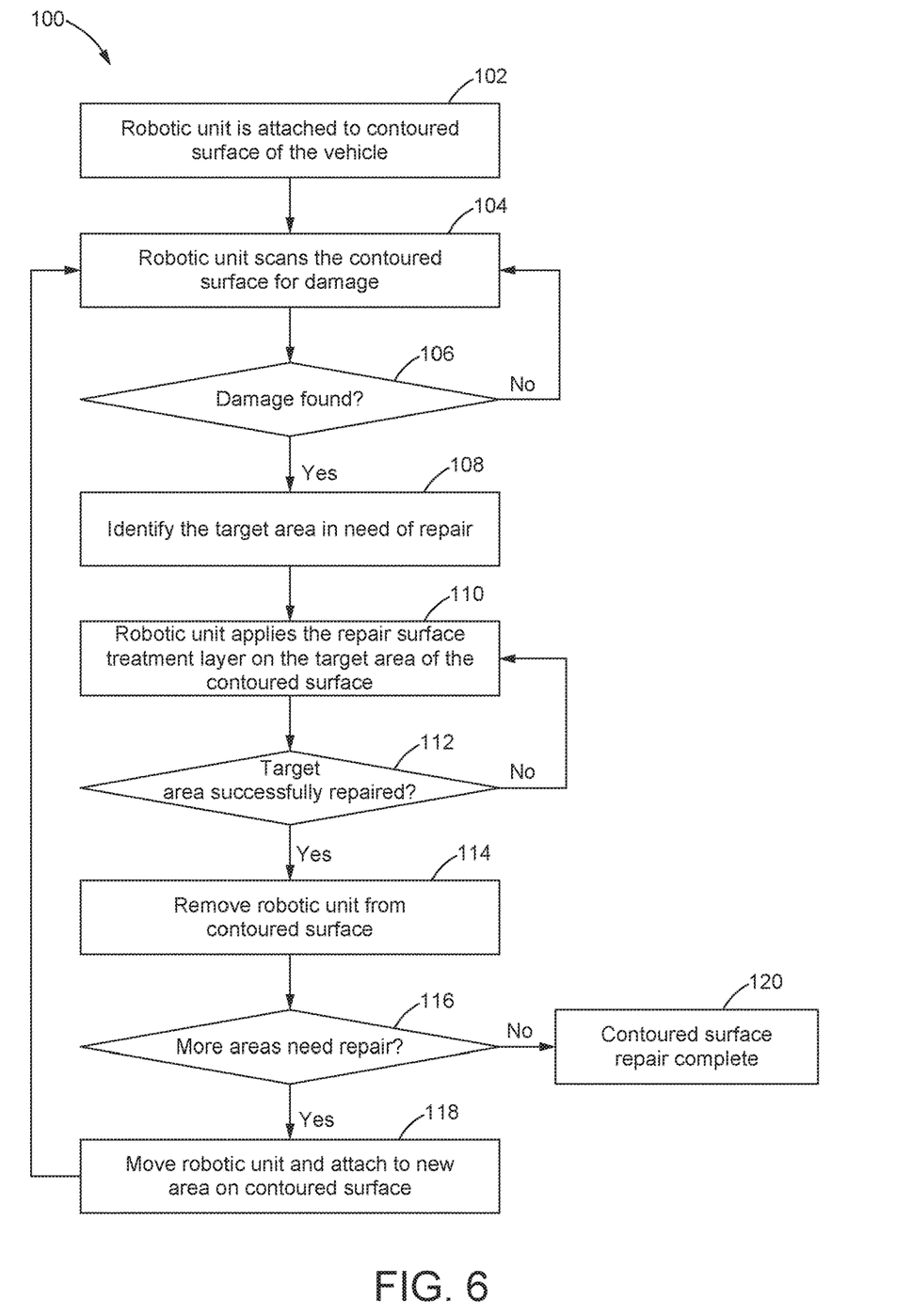
FIG. 6 is a flowchart illustrating an exemplary method of treating and/or repairing a contoured surface in accordance with the present disclosure.

Referring now to FIG. 6 and with reference to the proceeding FIGS. 1-5, a flowchart of an exemplary method or process 100 of using the robotic unit 48 to repair and treat the contoured surface 52 of the vehicle 20 is illustrated. In a first block 102 of the contoured surface repair process 100, the robotic unit 48 is attached to the contoured surface 52 of the vehicle 20. In one non-limiting example, the vehicle 20 is that of an airplane, and the contoured surface 52 is located on the surface of the fuselage 24, the wings 26, the tail section 28, the propulsion units 30, the nose portion 46, or other surface of the airplane. However, alternative embodiments of the robotic unit 48 can be configured to treat and repair other types of vehicles and machines. Moreover, in some embodiments, the robotic unit 48 includes an attachment device 50 that is configured to removably attach the robotic unit 48 to the contoured surface 52. In one non-limiting example, the attachment device 50 has one or more attachment heads 54, and one or more sealing elements 55, such as but not limited to, a suction cup or other sealing element, which is capable of producing a vacuum or other such negative pressure holding force to secure the attachment device 50 and the robotic unit 48 to the contoured surface 52 of the vehicle 20.

Once the robotic unit 48 is attached to the contoured surface 52, in a next block 104, the robotic unit 48 begins scanning an area of the contoured surface 52 to look for damage or other surface conditions of the contoured surface 52. In some embodiments, the robotic unit 48, and more specifically, the treating unit 76 of the robotic unit 48, includes one or more sensors 86 which are configured to scan the contoured surface 52 of the vehicle 20. Furthermore, in one non-limiting example, the one or more sensor 86 includes an image sensor, an optical sensor, or other known sensor, that is configured to scan the contoured surface 52 and create an image data file of the scanned area of the contoured surface 52. In some embodiments, the robotic unit 48 has a range of movement between 1-10 feet and as a result, the robotic unit 48 is capable of scanning square, rectangle, circle, arc, or other such shape having dimensions, such as a length, width, radius, or other such dimension, between 1-10 feet, however other ranges and dimensions are possible. In a next block 106, the determination is made whether the scanned area of the contoured surface 52 has any surface damage which is in need of repair. In one non-limiting example, the one or more sensors 86 collect an image data file of the paint or decorative and protective livery coating that is on the contoured surface 52. Furthermore, in some embodiments, the one or more sensors 86 and the robotic unit 48 are communicably coupled to the controller or computing device 92 which is programmed to control and operate the robotic unit 48. As a result, the image data file produced by the one or more sensors 86 is sent to the controller or computing device 92 to undergo further analysis. In one embodiment, the controller or computing device 92 compares the image data file collected of the contoured surface 52 with a pristine image data file. In some embodiments, the controller or computing device 92 is programmed to overlay or otherwise compare the image data file of the contoured surface 52 with the pristine image data file and look for any inconsistencies between the two image data files. If the controller or computing device 92 detects inconsistencies then the controller or computing device 92 provides an alert that damage to the contoured surface 52 has been found. On the other hand, if the controller or computing device 92 does not find any inconsistencies between the image data files then, in some embodiments, the robotic unit 48 will continue scanning the contoured surface 52. Furthermore, in some embodiments, the robotic unit 48 is detached from the previously scanned area of the contoured surface 52 and moved to a new area of the contoured surface 52 to be scanned.

In a next block 108, once a determination is made that damage is present on the contoured surface 52, the target area 90 in need of repair on the contoured surface 52 is identified and defined. In some embodiments, the controller or computing device 92 determines the target area 90 to be repaired and directs and controls the robotic unit 48 to make the necessary repairs. In a next block 110, the robotic unit 48 begins making the necessary repairs to the contoured surface 52. In one non-limiting example, the robotic unit 48 is configured to repair the paint and/or decorative and protective livery coating that is on the contoured surface 52. As a result, the treating unit 76, which includes the treatment array 80 and one or more applicator heads 78, applies one or more coatings such as a surface protective layer, an adhesion promoting layer, a primer layer, a basecoat layer, a top coat layer, a clear coat layer, or other known coatings, and the one or more coatings comprise the repair treatment layer 88.

Furthermore, in some embodiments, the target area 90 to be repaired on the contoured surface 52 includes a complex decorative paint scheme or livery design that has been damaged. In such situations, the image data file collected by the one or more sensors 86 of the robotic unit 48 is utilized by the controller or computing device 92 to determine what repairs need to be made. As a result, the controller or computing device 92 determines which portions of the decorative paint scheme or livery design needs to be repaired and the treating unit 76 applies the one or more coatings which comprise the repair treatment layer 88. Moreover, in some embodiments, the controller or computing device 92 is capable of stitching or otherwise blending the image data file collected on the contoured surface 52 with the pristine image data file such that the repair treatment layer 88 is applied to blend the target area 90 of the contoured surface 52 with the surrounding, unrepaired, area of the contoured surface 52. As a result, the newly applied repair treatment layer 88 is undistinguishable from the other portions of the decorative paint scheme or livery design on the contoured surface 52 of the vehicle 20.

In a next block 112, in some embodiments, following the application of the repair treatment layer 88 the robotic unit 48 scans the treated or repaired target area 90 of the contoured surface 52. In one non-limiting example, the robotic unit 48 collects a post-treatment image data file using the one or more sensors 86 that are attached to the robotic unit 48. The post-treatment image data file is analyzed by the controller or computing device 92. In one non-limiting example, the post-treatment image data file is compared to the pristine image data file. If the post-treatment image data file and the pristine image data file match, then the controller or computing device 92 determines the target area 90 is successfully repaired. However, if the post-treatment image data file and the pristine image data file do not match, then in some embodiments, the controller or computing device 92 will direct the robotic unit 48 to rework or reapply the repair treatment layer 88 to the target area 90 of the contoured surface 52.

Following the successful repair of the contoured surface 52, in a next block 114 the robotic unit 48 is removed from the contoured surface 52 of the vehicle 20. In some embodiments, the robotic unit 48 is removed from the contoured surface 52 by deactivating the attachment device 50 of the robotic unit 48. Furthermore, in some embodiments, the deactivation of the attachment device 50 is communicated to the robotic unit 48 by the controller or computing device 92. Alternatively or additionally, the robotic unit 48 has a local control on the robotic unit 48 configured to allow a user or operator of the robotic unit 48 to deactivate the attachment device 50 and remove the robotic unit 48 from the contoured surface 52.

In a next block 116, the determination is made whether more repairs of the contoured surface 52 are needed. If there are additional areas of the vehicle 20 which require repair, then in a next block 118, the robotic unit 48 is moved to the next area in need of repair and attached to the contoured surface 52 of the vehicle 20. Following the attachment of the robotic unit 48 to the next area in need of repair the robotic unit 48 begins scanning the contoured surface 52 for damage, similar to the process outlined in block 104. Alternatively, if no additional repairs of the contoured surface 52 are needed, then in a next block 120 it is determined that the contoured surface 52 repair is complete and the vehicle 20 either continues with additional scheduled repairs or is returned back into service.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A method of repairing a surface treatment on a contoured surface, the method comprising:
   attaching a surface treatment repair assembly to the contoured surface, the surface treatment repair assembly including a robotic unit and an array of applicator heads, each applicator head being configured to apply a repair treatment to the contoured surface;
   determining a location of the surface treatment relative to the surface treatment repair assembly using an optical sensor to scan the contoured surface and generate an image data set of the contoured surface;
   identifying a damaged portion of the surface treatment and defining a target area for surface treatment repair based on comparing the image data set generated by the optical sensor and a pristine image data set;
   positioning the surface treatment repair assembly with the array of applicator heads adjacent to the surface treatment; and
   selectively operating each applicator head to repair the surface treatment.

2. The method of claim 1, in which an orientation sensor is provided on the surface treatment repair assembly and configured to generate an orientation data set indicative of an orientation of each applicator head relative to the contoured surface.

3. The method of claim 2, further comprising maintaining each applicator head in a normal position relative to the contoured surface based on the orientation data set.

4. The method of claim 1, in which the array of applicator heads comprises one or more inkjet printing heads, and selectively operating each applicator head comprises applying a decorative layer to the contoured surface.

5. The method of claim 1, in which positioning the surface treatment repair assembly with the array of applicator heads adjacent to the surface treatment comprises operating a first stage linear actuator operatively coupled to the array of applicator heads and configured to actuate the array of applicator heads, and operating a second stage linear actuator operatively coupled each applicator head of the array of applicator heads and configured to actuate each applicator head of the array of applicator heads.

6. The method of claim 5, in which operating the first stage linear actuator comprises adjusting a position of the array of applicator heads relative to the target area, and in which operating the second stage linear actuator comprises adjusting each applicator head relative to the contoured surface.

7. A method of repairing a surface treatment on a contoured surface, the method comprising:
attaching a surface treatment repair assembly to the contoured surface, the surface treatment repair assembly including a robotic unit, having an articulated support arm, and an array of applicator heads mounted on the articulated support arm of the robotic unit, wherein each applicator head of the array of applicator heads is configured to apply a repair treatment to the contoured surface;
determining a location of the surface treatment relative to the surface treatment repair assembly using an optical sensor to scan the contoured surface and generate an image data set of the contoured surface;
identifying a damaged portion of the surface treatment and defining a target area for surface treatment repair based on comparing the image data set generated by the optical sensor and a pristine image data set;
moving the robotic unit to position the array of applicator heads adjacent to the target area; and
selectively operating each applicator head of the array of applicator heads to repair the damaged portion of the surface treatment on the contoured surface.

8. The method of claim 7, in which an orientation sensor is provided on the surface treatment repair assembly, the orientation sensor being configured to generate an orientation data set indicative of an orientation of each applicator head relative to the contoured surface and generate an orientation data set, and in which the method comprises further positioning each applicator head of the array of applicator heads based on the orientation data set.

9. The method of claim 8, in which positioning each applicator head of the array of applicator heads is performed in real time.

10. The method of claim 8, in which positioning each applicator head of the array of applicator heads comprises maintaining each applicator head in a normal orientation relative to a contour of the contoured surface based on the orientation data set.

11. The method of claim 7, in which the array of applicator heads comprises a plurality of inkjet printing heads, and selectively operating each applicator head of the array of applicator heads comprises applying a decorative layer to the target area.

12. The method of claim 7, in which selectively operating each applicator head of the array of applicator heads comprises applying a surface protective layer to the target area.

13. The method of claim 7, in which positioning the surface treatment repair assembly with the array of applicator heads adjacent to the surface treatment comprises operating a first stage linear actuator operatively coupled to the array of applicator heads and configured to actuate the array of applicator heads, and operating a second stage linear actuator operatively coupled each applicator head of the array of applicator heads and configured to actuate each applicator head of the array of applicator heads.

14. The method of claim 13, in which operating the first stage linear actuator comprises adjusting a position of the array of applicator heads relative to the target area, and in which operating the second stage linear actuator comprises adjusting each applicator head relative to the contoured surface.

15. A method of repairing a surface treatment on a contoured surface of an airplane, the method comprising:
attaching a surface treatment repair assembly to the contoured surface, the surface treatment repair assembly including a robotic unit, having an articulated support arm, and an array of applicator heads mounted on the articulated support arm of the robotic unit, wherein each applicator head of the array of applicator heads is configured to apply a repair treatment to the contoured surface;
determining a location of the surface treatment relative to the surface treatment repair assembly using an optical sensor to scan the contoured surface and generate an image data set of the contoured surface, and an orientation sensor to determine an orientation of each applicator head and generate an orientation data set;
identifying a damaged portion of the surface treatment and defining a target area for surface treatment repair based on comparing the image data set generated by the optical sensor and a pristine image data set;
moving the robotic unit to position the array of applicator heads adjacent to the target area;
positioning each applicator head of the array of applicator heads based on the orientation data set; and
selectively operating each applicator head of the array of applicator heads to repair the damaged portion of the surface treatment on the contoured surface.

16. The method of claim 15, in which positioning each applicator head of the array of applicator heads is performed in real time.

17. The method of claim 15, in which positioning each applicator head of the array of applicator heads comprises maintaining each applicator head in a normal orientation relative to a contour of the contoured surface based on the orientation data set.

18. The method of claim 15, in which the array of applicator heads comprises a plurality of inkjet printing heads, and selectively operating each applicator head of the array of applicator heads comprises applying a decorative layer to the target area.

19. The method of claim 15, in which positioning the surface treatment repair assembly with the array of applicator heads adjacent to the surface treatment comprises operating a first stage linear actuator operatively coupled to the array of applicator heads and configured to actuate the array of applicator heads, and operating a second stage linear actuator operatively coupled each applicator head of the array of applicator heads and configured to actuate each applicator head of the array of applicator heads.

20. The method of claim 19, in which operating the first stage linear actuator comprises adjusting a position of the array of applicator heads relative to the target area, and in which operating the second stage linear actuator comprises adjusting each applicator head relative to the contoured surface.

* * * * *